(12) United States Patent
Beck

(10) Patent No.: US 7,343,819 B2
(45) Date of Patent: Mar. 18, 2008

(54) FLOW METER FOR GASEOUS MEDIA

(75) Inventor: Michel Beck, Ernolsheim/Bruche (FR)

(73) Assignees: Burkert Werke GmbH & Co. KG, Ingelfingen (DE); Burkert & Cie, S.A.R.L., Triembach-au-Val (FR)

( * ) Notice: Subject to any disclaimer, the term of this patent is extended or adjusted under 35 U.S.C. 154(b) by 33 days.

(21) Appl. No.: 11/223,560

(22) Filed: Sep. 9, 2005

(65) Prior Publication Data

US 2006/0053901 A1    Mar. 16, 2006

(30) Foreign Application Priority Data

Sep. 13, 2004    (DE)    ............. 10 2004 044 146

(51) Int. Cl.
*G01F 1/32*    (2006.01)
(52) U.S. Cl. .................................. 73/861.23
(58) Field of Classification Search ............ 73/861.23, 73/861.22, 861.19, 861.25, 861.28, 861.31
See application file for complete search history.

(56) References Cited

U.S. PATENT DOCUMENTS 4,879,908 A    11/1989   Tutumi 5,503,035 A  *  4/1996   Itoh et al. ................ 73/861.23

FOREIGN PATENT DOCUMENTS

DE       3601407 A1    7/1987
DE    38 72 276 T2    9/1988

OTHER PUBLICATIONS

Menz, Bernhard, Dittes, Markus; Vortex-Durchflussmesser mit akustischer Wirbeldetektion in Clamp-on Technik; Technisches Messen 64 (1997), pp. 54-59.

* cited by examiner

*Primary Examiner*—Jewel Thompson
(74) *Attorney, Agent, or Firm*—Stuart J. Friedman

(57) ABSTRACT

For the purpose of metering a flow of gaseous media, there is arranged a perturbation body in a measuring chamber which has a medium flowing through it, and an ultrasonic excitation signal is transmitted through the measuring chamber transverse to the direction of flow and at a point downstream of the perturbation body. The ultrasonic excitation signal after having traversed the measuring chamber is captured together with the ultrasonic excitation signal transmitted as structure-borne noise. The captured signal is squared first and then demodulated with a filter. An indication for the flow through the measuring chamber is derived from the frequency of the demodulated signal.

10 Claims, 2 Drawing Sheets

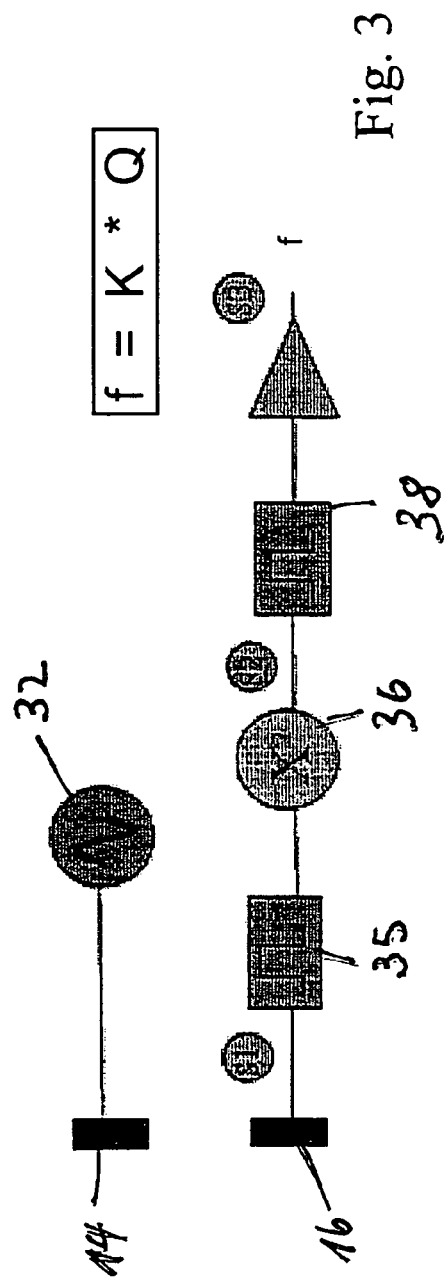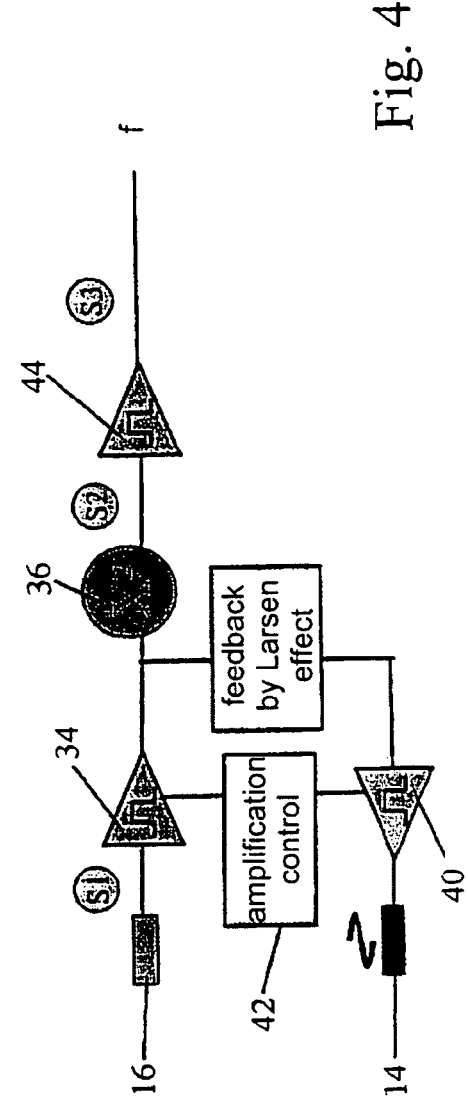

FLOW METER FOR GASEOUS MEDIA

TECHNICAL FIELD

The invention relates to a flow meter for gaseous media as well as to a method of metering the flow of gaseous media.

BACKGROUND OF THE INVENTION

Various physical effects come into consideration for a direct and contact-free metering of a flow of gaseous media. With a thermal method, the cooling down of a heating resistor arranged in a measuring bridge caused by the medium is sensed and evaluated. In case a Coanda nozzle is used, a pressure difference caused by the flow is measured and evaluated. A further possibility is the Vortex method in which eddies are generated by having a flow of a medium along a perturbation body, the frequency offset, which is caused by the eddies, of an acoustic signal being measured which is transmitted transverse to the direction of flow. Each of these methods has its advantages and disadvantages. The former methods have a somewhat long response time with respect to changes in flow and are only suitable for relatively small flow rates (thermal method) or relatively high ones (Coanda nozzle method). The latter method is difficult from the aspect of measurement technology, because the changes in frequency, caused by the eddies, are very small and the wanted signal has a very low amplitude in relation to the excitation signal which in fact is transferred directly to the receiver through the corpus of the measuring chamber.

Nevertheless, the invention makes use of the Vortex method for which it suggests a particularly advantageous signal evaluation.

BRIEF SUMMARY OF THE INVENTION

The flow meter suitable for gaseous media and designed according to the invention comprises a sensor having a measuring chamber with a perturbation body arranged therein. An ultrasonic transmitter is arranged at the measuring chamber downstream of the perturbation body. An ultrasonic receiver is arranged at the measuring chamber so as to lie opposite the ultrasonic transmitter. A signal processing means squares the measured signal received by the ultrasonic receiver and demodulates it by means of filtering, in particular by bandpass filtering. The frequency of the so obtained wanted signal is proportional to the real flow of the medium in the measuring chamber. The signal processing means is constituted to advantage by a digital signal processor. The invention is based on the cognition that it will be not necessary to decouple the ultrasonic excitation signal from the corpus of the measuring chamber by complex mechanical measures, in order to lower the amplitude of the excitation signal—which is directly transmitted to the receiver through structure-borne noise—in relation to the amplitude of the wanted signal traversing the measuring chamber, because it is true that by means of a special processing of the signal the frequency offset generated by the eddies downstream of the perturbation body can be reliably detected even with a very small amplitude of the wanted signal.

The subject-matter of the invention further consists in a method of metering a flow of gaseous media, a perturbation body being arranged in a measuring chamber which has a medium flowing through it, and an ultrasonic excitation signal being transmitted through the measuring chamber transverse to a direction of flow and at a point downstream of the perturbation body. The ultrasonic excitation signal after having traversed the measuring chamber is captured together with the ultrasonic excitation signal transmitted as structure-borne noise. The captured signal is squared first and then demodulated with a filter. An indication for a flow through the measuring chamber is derived from the frequency of the demodulated signal.

BRIEF DESCRIPTION OF THE DRAWINGS

FIG. 3 shows a diagram for illustrating the functional principle of the flow meter; and FIG. 4 is a block diagram of the flow meter.

DETAILED DESCRIPTION OF THE PREFERRED EMBODIMENTS

Figure 1:
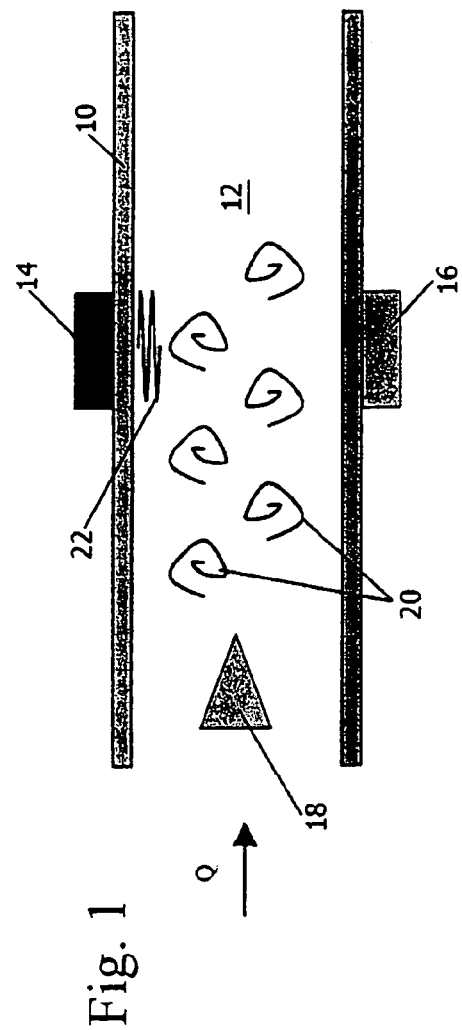
FIG. 1 schematically shows a sensor for metering a gaseous flow.

The sensor schematically depicted in FIG. 1 comprises a duct portion 10, the interior space 12 of which forms a measuring chamber 12. Arranged on the outer perimeter of the duct portion 10 are two ultrasonic transducers 14, 16 so as to lie diametrically opposed to each other and in direct mechanical contact with the corpus of the duct portion 10. The ultrasonic transducer 14 is a transmission transducer, the ultrasonic transducer 16 is a reception transducer. A perturbation body 18 is arranged in the measuring chamber 12 upstream of the transducers 14, 16. The perturbation body 18 is centrally arranged in the gaseous flow Q axially flowing through the measuring chamber 12, and causes eddies 20 therein which rotate in different directions and separate from the perturbation body 18. The transmission transducer 14 sends an ultrasonic wave 22 in perpendicular direction through the gaseous flow Q. Due to the eddies 20 the ultrasonic wave 22 is modulated in phase and frequency, because the eddies alternatingly accelerate and decelerate the ultrasonic wave. The separation frequency of the eddies 20 is proportional to the flow speed of the gaseous flow Q. By measuring the variation speed of the ultrasonic wave received by the reception transducer 16, after it having traversed the gaseous flow, one obtains the flow speed and can determine the flow from this.

Figure 2:
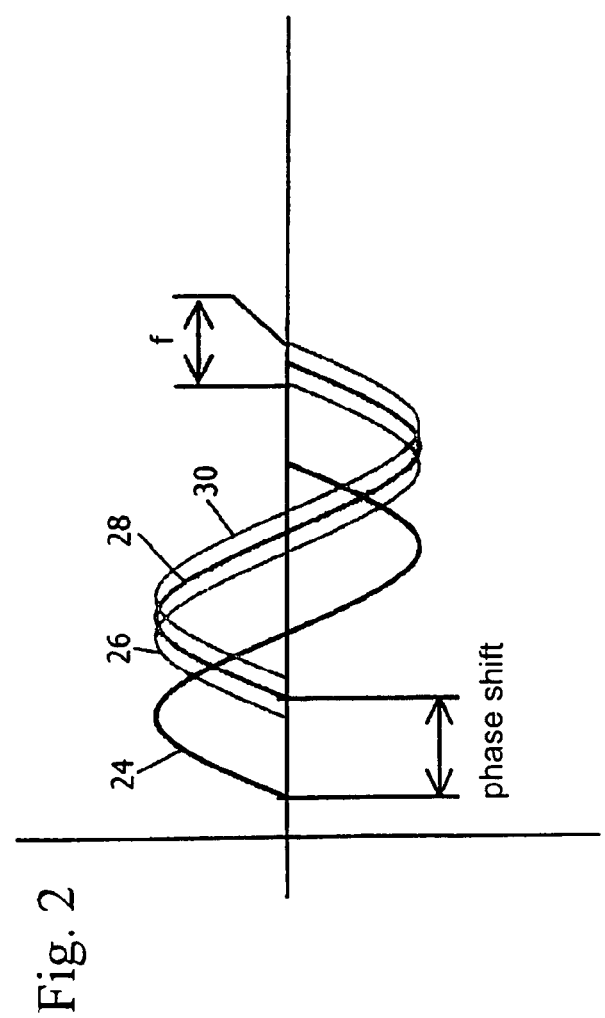
FIG. 2 shows a diagram for illustrating the modulation used for metering the flow.

FIG. 2 shows the ultrasonic wave emanating from the transmission transducer 14 as a sinus curve 24, and the ultrasonic wave in the form of sinus curves 26, 28, 30, which has been modulated in phase by the eddies and is received by the reception transducer 16. The time interval between the sinus curves 26, 30 corresponds to one modulation frequency f.

The reception transducer 16, however, does not only receive the "wanted signal", which is generated by the ultrasonic wave emitted by the transmission transducer 14 after having traversed the gaseous flow Q, but also the transmitted signal which is received directly through the metallic corpus of the duct portion 10 as structure-borne noise, having an amplitude which is much larger than that of the wanted signal. By the signal processing proposed according to the invention, however, it will still be possible to reliably determine the modulation frequency f of the wanted signal, which frequency is proportional to the flow which is sought after.

The principle of the signal processing will become apparent from FIG. 3. The transmission transducer 14 is driven by an oscillator 32 with an ultrasonic excitation signal of 300,000 Hz, for instance. The reception transducer 16 receives the signal emitted by the transmission transducer 14, when it has traversed the gaseous flow. The received signal S1 is filtered with a bandpass filter 35 and applied to a multiplier 36 which multiplies the signal S1 by itself, i.e. squares it. The output signal S2 of the multiplier 36 is filtered by a bandpass filter 38 and demodulated to S3 thereby. The frequency f of the demodulated signal S3 is proportional to the flow to be determined: Q=K*Q, with K being a constant.

The same principle is employed with the embodiment shown in FIG. 4, but with some further special features.

The transmission transducer 14 is driven by an amplifier 40 having a bandpass filter. The output of the amplifier 34, likewise provided with a bandpass filter, is fed back to the input of the amplifier 40. As transmission transducer 14 and reception transducer 16 are also mechanically coupled by the corpus of the duct portion 10, there arises a closed feedback loop owing to the so-called Larsen effect. The system made up of the mechanically coupled ultrasonic transducers 14, 16 and the amplifiers 34, 40 tunes in to a system's natural resonant frequency whereby manufacturing tolerances of the transducers will be balanced out. An amplification control 42 provides a stable amplitude of the generated ultrasonic excitation signal.

The reception transducer 16 receives, on the one hand, the excitation signal A sin (a) directly as structure-borne noise and, on the other hand, the much weaker wanted signal B sin (a+b), wherein "b" is the phase offset caused by eddies. Thus, the received signal S1 is the sum of both signals:

$$S1 = A\sin(a) + B\sin(a+b)$$

The signal S1 is multiplied by itself by means of the multiplier 36, i.e. is squared to give a signal S2. With the known trigonometric formulas, this will result in $$S2 = (A^2+B^2)/2 - A^2/2 \cos(2a) - B^2/2 \cos(2a+2b) + AB\cos(b) - AB\cos(2a+2b).$$

Here, the term AB cos (b) is only dependent on the modulation which is to be determined. By filtering in an amplifier 44 including a bandpass filter the corresponding signal part $$S3 = AB\cos(b)$$

will be isolated. Its frequency f is in proportion to the flow to be determined:

$$f = K*Q,$$

wherein K is a constant of the system.

The described signal processing is performed with a digital signal processor. An indication signal for the actual flow is formed from the signal S3 and its frequency f, respectively.

The invention claimed is:

1. A flow meter suitable for gaseous media, said flow meter comprising a sensor having a measuring chamber with a perturbation body arranged therein, an ultrasonic transmitter arranged at said measuring chamber downstream of said perturbation body, an ultrasonic receiver arranged at said measuring chamber opposite said ultrasonic transmitter, and signal processing means which squares a measured signal received by said ultrasonic receiver and demodulates it by means of filtering.

2. The flow meter according to claim 1, wherein said ultrasonic transmitter is driven by a transmitter amplifier which has an input to which a received signal is fed back which comes from said ultrasonic receiver and has been boosted by a reception amplifier.

3. The flow meter according to claim 2, wherein said transmitter amplifier comprises a bandpass filter.

4. The flow meter according to claim 2, wherein said reception amplifier comprises a bandpass filter.

5. The flow meter according to claim 2, comprising a gain control by which an amplitude of a transmitted signal applied to said ultrasonic transmitter is kept constant.

6. The flow meter according to claim 1, wherein said measuring chamber is constituted by a duct portion which has an outer perimeter to which two ultrasonic transducers are mounted in direct contact to said duct portion and so as to lie diametrically opposed to each other, serving as an ultrasonic transmitter and an ultrasonic receiver, respectively.

7. The flow meter according to claim 1, wherein said signal processing means includes a bandpass filter for demodulating said squared measured signal.

8. The flow meter according to claim 1, wherein said signal processing means comprises a digital signal processor.

9. A method of metering a flow of gaseous media, comprising the steps of:
    arranging a perturbation body anged in a measuring chamber which has a medium flowing through it;
    transmitting an ultrasonic excitation signal through said measuring chamber transverse to a direction of flow and at a point downstream of said perturbation body;
    capturing said ultrasonic excitation signal, after having traversed said measuring chamber, together with said ultrasonic excitation signal transmitted as structure-borne noise, said captured signal being squared first and then demodulated with a filter; and
    deriving an indication for a flow through said measuring chamber from the frequency of said demodulated signal.

10. The method according to claim 9, wherein said captured signal is processed by a digital signal processor.

* * * * *